Nov. 3, 1953 M. WINKLER 2,657,855

TRUE NEGATIVE OVERDRAFT MECHANISM FOR PLURAL TOTALIZERS

Filed Sept. 7, 1950

3 Sheets-Sheet 1

MAX WINKLER
*Inventor*

BY Carl Beust

Richard Van Buskirk
HIS *Attorneys*

Nov. 3, 1953 M. WINKLER 2,657,855

TRUE NEGATIVE OVERDRAFT MECHANISM FOR PLURAL TOTALIZERS

Filed Sept. 7, 1950

3 Sheets-Sheet 2

MAX WINKLER
*Inventor*

BY Carl Beust

Richard Van Busum

HIS *Attorneys*

Nov. 3, 1953 M. WINKLER 2,657,855

TRUE NEGATIVE OVERDRAFT MECHANISM FOR PLURAL TOTALIZERS

Filed Sept. 7, 1950

3 Sheets-Sheet 3

INVENTOR
MAX WINKLER

BY Carl Beust

Richard Van Busum

HIS ATTORNEYS

Patented Nov. 3, 1953

2,657,855

UNITED STATES PATENT OFFICE 2,657,855

TRUE NEGATIVE OVERDRAFT MECHANISM FOR PLURAL TOTALIZERS

Max Winkler, Zurich, Switzerland, assignor to The National Cash Register Company, Dayton, Ohio, a corporation of Maryland Application September 7, 1950, Serial No. 183,486

5 Claims. (Cl. 235—60.2)

This invention relates to accounting and similar calculating machines, and is more particularly concerned with totalizer control mechanism adapted to convert a complementary overdraft in an add-subtract totalizer, or crossfooter, into a true negative balance and print it as such.

Machines equipped with two crossfooters or add-subtract totalizers operate quite satisfactorily when neither of the two totalizers is overdrawn, or where one totalizer only becomes overdrawn, if this particular totalizer is equipped with a known overdraft conversion mechanism. In the case of the further totalizer, however, which heretofore has not been adapted to give a true negative overdraft, the occurrence of such an overdraft formerly necessitated the performance of a series of complicated manually initiated machine operations in order to effect the necessary conversion. Such operations have the further disadvantage that another of the totalizers has to be used in the manually initiated conversion process just mentioned, and its use for other purposes is lost.

It is known to provide multiple add-subtract totalizer machines with an overdraft conversion mechanism to all the totalizers. The present invention, however, has for its object to provide means whereby an existing machine having an overdraft conversion mechanism constructed to convert an overdraft in one totalizer only, may readily be adapted so as to convert overdrafts in respect of one or more additional add-subtract totalizers.

The invention comprises, therefore, an accounting or similar calculating machine including a plurality of add-subtract totalizers, and individual engaging control mechanism for each totalizer, an overdraft conversion mechanism, and a member normally positioned, during overdraft conversion operations, in cooperative relationship with the engaging control mechanism for a certain totalizer only, wherein there is provided an overdraft control key for at least one other add-subtract totalizer, and mechanism controlled by operation of said overdraft control key to shift the member out of cooperative relationship with the engaging control mechanism for the first mentioned totalizer and into cooperative relationship with the engaging control mechanism for said other totalizer, so that the overdraft conversion mechanism will compute and print a true overdraft in respect of the latter totalizer.

The above, and other subsidiary features of the present invention, as applied, by way of example only, to one manner of carrying it into effect, will now be described with reference to the accompanying drawings.

The mechanisms of the machine, to which it is necessary to refer in order to enable a full understanding of the present example, are described and disclosed in United States Patents Nos. 2,079,355 to Charles L. Lee, issued May 4, 1937, and 2,243,806 to Laurence N. Lehman, issued May 27, 1941, and will be only briefly referred to herein.

In general terms, the process previously followed for the automatic conversion of a complementary overdraft figure into a true overdraft figure, according to U. S. Patent No. 2,243,806, which discloses the printing of either a total or sub-total of a true overdraft, necessitates four cycles of the machine, and is as follows:

First cycle: Total of the complementary overdraft cleared from one totalizer and transmitted additively to an auxiliary retaining device.

Second cycle: Complementary figure cleared from the auxiliary retaining device and subtracted from the previously cleared totalizer. This leaves the true overdraft in the latter.
Third cycle: Total of the true overdraft cleared from the auxiliary retaining device and printed.

The above relates to a total of the true overdraft. If a tub-total of the true overdraft is desired, mechanism conditioned by depression of an overdraft sub-total key comes into operation and is effective, when the true overdraft figure is cleared from the auxiliary retaining device in the fourth cycle of operation, to re-enter this subtractively into the totalizer, whereby the latter is restored to the same condition as when the automatic overdraft conversion operation was initiated, i. e. containing the complement of the overdraft.

In the machine of the present invention, this automatic overdraft conversion mechanism is adapted also to be effective to convert an overdraft occurring in another add-subtract totalizer.

The overdraft conversion mechanism is normally associated with one of the totalizers, hereinafter referred to as the "No. 1" totalizer, in a manner similar to that disclosed in U. S. Patent No. 2,243,806, to convert a complementary overdraft, occurring in said totalizer, into a true overdraft.

It is known, in prior machines, as disclosed in United States Patent No. 2,088,092 to Albert Ott, issued July 27, 1937, to provide mechanism for automatically locking the total-taking keys for either totalizer No. 1 or another totalizer, hereinafter referred to as the "No. 3" totalizer, when an overdraft occurs in the related totalizer.

The adaptation of the existing overdraft conversion mechanism to the No. 3 totalizer will now be described.

Figure 1:
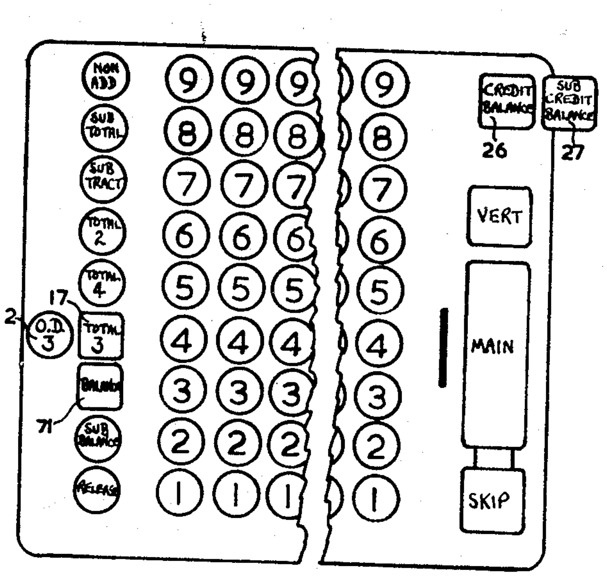
Fig. 1 is a diagrammatic view of the machine keyboard, partly broken away.

When an overdraft occurs in the No. 1 totalizer, a pitman 1 (Fig. 2), is adapted to be moved rearwardly, as seen in this figure, to lock a total-taking key 17 for this totalizer against operation as a signal to the machine operator that an overdraft is present, as referred to above. Concurrently, mechanism, similar to that disclosed in prior U. S. Patent No. 2,079,355, and normally associated with the No. 1 totalizer, unlocks the normally locked overdraft key 26 (Fig. 1) and sub-overdraft key 27, operation of either of which keys initiates an automatic series of four cycles of machine operation in known manner. The operations incidental to the occurrence of these four cycles will be referred to in more detail hereinafter in relation to taking the overdraft from totalizer No. 3.

Figure 10:
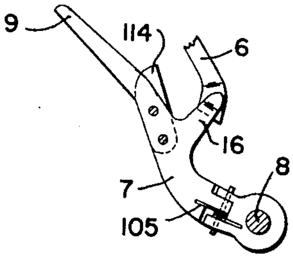
Figure 10 is a detail view of the hinged arm for controlling the selection of the add-subtract totalizers in overdraft conversion operations.

Depression of either of the keys 26 or 27 causes a shaft 8 (Fig. 2) to be rocked counter-clockwise as seen in this figure as will be explained presently. Fast on the shaft 8 is a hub 100 having hinged thereto, at 15, an arm 7 so that the arm is permitted a limited lateral rocking movement. The arm 7 is normally under the tension of a torsion spring 105 (Fig. 10) about the pivot 15, so that the arm is normally retained in a position to the right, as seen from the front of the machine, in preparation for total-taking from the No. 1 totalizer.

Secured to the left side of the arm 7 is a plate 14, adapted to effect selection of the No. 3 totalizer, and a similar plate 114 (Fig. 10) is provided on the other side of the arm for the selection of the No. 1 totalizer.

Projecting about mid-way of the arm 7 is an extension 16, formed with a camming surface adapted to cooperate with a downward extension 6 of a selecting lever 5 pivoted on a stud 29 fixed to a side frame of the machine. The lever 5, at its top end, is bifurcated to form an extension 4, and a right-angled projection 30.

Slidably supported in a suitable manner in a keyboard supporting plate is a key 2, adapted to control overdraft conversion operations in respect to the No. 3 totalizer, and hereinafter referred to as the "O. D. 3" key. The O. D. 3 key 2 has a stud 3 thereon adapted, when the key is depressed, to cooperate with the right-angled projection 30 on the lever 5, to rock the lever counter-clockwise on its pivot stud 29, causing the downward extension 6 thereof to cooperate with the camming surface on the extension 16, to rock the arm 7 to the left as viewed from the front of the machine, against the action of the spring 105. This causes the plate 14 to be aligned with a total key latch 13 for the No. 3 totalizer. The total key latch 13 for the No. 3 totalizer has a stud 12 midway thereon, adapted to cooperate with the plate 14. The lower end of the total key latch 13 has a stud 31 which cooperates with a cam surface of a pawl setting lever 103, so as to set pawls 32 and 33 into cooperative relationship with a flying lever 34 for the No. 3 totalizer, in known manner.

Figures 7, 8:
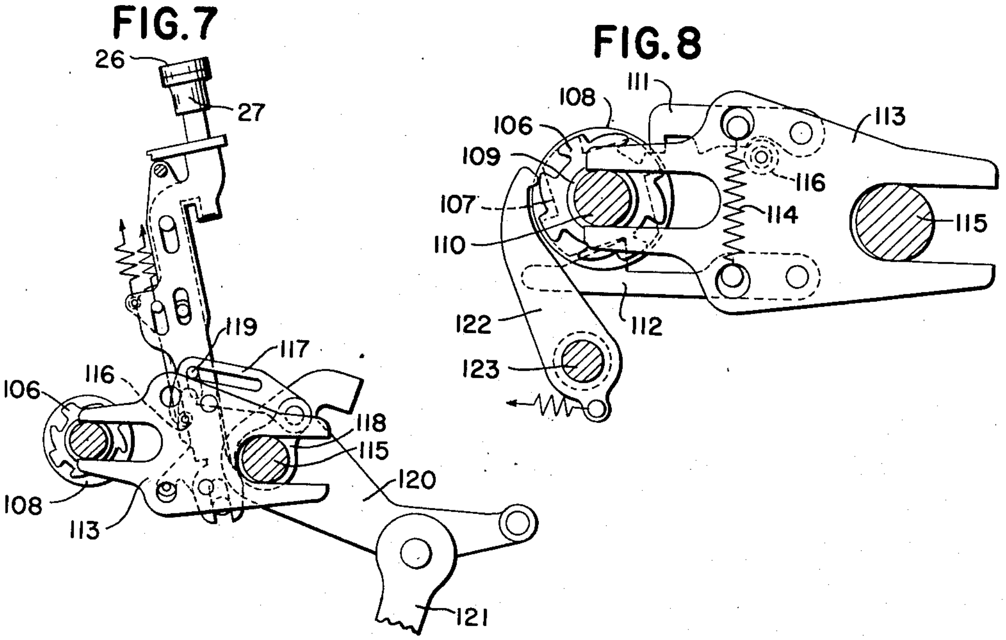
Figure 7 is a detail view of the mechanism for connecting the main driving mechanism of the machine to the overdraft control mechanism.
Figure 8 is a detail view of the slide for operating the overdraft control mechanism.
Figure 9:
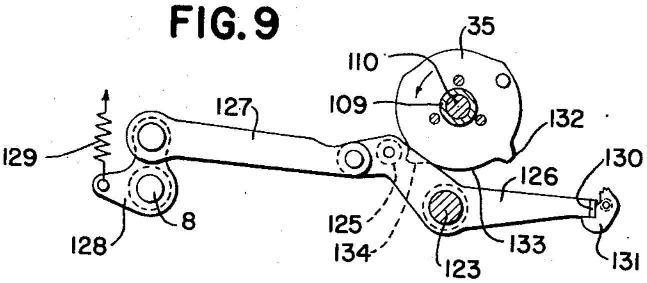
Figure 9 is a detail view of the cam and associated mechanism for controlling the selection and conditioning of the add-subtract totalizers in overdraft conversion operations.

Operation of the shaft 8 to control the selection of the add-subtract totalizers in overdraft operations is controlled by a cam 35 (Figs. 3 and 9), which with a cam 36 for controlling the selection of an overdraft retaining device, a cam 38 for controlling the functioning of the printing mechanism in overdraft operations, and cam driving ratchets 106 and 107 (Figs. 7 and 8) form an integral assembly or cluster, said parts being secured in fixed relationship to each other on a sleeve 109 rotatably supported on a stud 110 secured in the left main frame. The ratchet 106 has four teeth which coact with the tooth of a feed pawl 111, and the ratchet 107 has four teeth which coact with the tooth of a feed pawl 112, both of said pawls being pivotally mounted on an operating slide 113, having parallel slots therein, the left-hand one of which (Fig. 8) slidably engages the stud 110 and the right hand one of which slidably engages a main shaft 115 journaled in the machine framework. A spring 114 is tensioned between studs carried by the pawls 111 and 112, said studs extending through clearance holes in the slide 113, and urges said pawls toward each other to maintain them in yielding engagement with the teeth of their corresponding ratchets.

The slide 113 (Figs. 7 and 8) carries a stud 116 arranged to be engaged by a notch in an operating link 117 pivotally connected to a crank 118 secured on the main shaft 115. Also secured on the main shaft 115 (Fig. 7) is an operating lever 120 having pivotally connected thereto the upper end of an operating pitman 121 the lower end of which is connected to a clutch mechanism, which is in turn connected to the usual operating motor, said pitman receiving movement during a cycle of machine operation to oscillate the lever 120 first counter-clockwise and then clockwise through an angle of approximately 60 degrees. The link 117 (Fig. 7) has a slot engaged by a stud 119 secured in the stem of the Credit Balance key 26, said stud extending through a clearance slot in the stem of the Sub-Credit Balance key 27, which latter key is mounted in the stem of the Credit Balance key 26 in such a manner that depression of said Sub-Credit Balance key 27 carries the Credit Balance key 26 downwardly in unison therewith to initiate a Sub-Credit Balance operation. However, depression of the Credit Balance key 26 to initiate a Credit Balance operation has no effect on the Sub-Credit Balance key 27, which remains in its upward or underpressed position during credit balance operations.

Depression of either the Credit Balance key 26 or the Sub-Credit Balance key 27 (Fig. 7) through the stud 119 carries the link 117 downwardly in unison therewith to engage the notch in said link with the stud 116 to couple the main shaft 115 to the slide 113 for actuation in overdraft operations. Oscillating movement of the lever 120 and the shaft 115, as explained above, through the link 117, shifts the slide 113 first rearwardly or toward the left, as here viewed, and then forwardly to normal position. Initial movement rearwardly of the slide 113 causes the pawl 111 (Figs. 7 and 8) in cooperation with the teeth in the ratchet 106 to rotate said ratchet and the cluster of cams connected thereto one eighth of a revolution in a counter-clockwise direction. Return movement forwardly of the slide 113 causes the pawl 112, in cooperation with the teeth in the ratchet 107 to also rotate the ratchet 107 and the cluster of cams connected thereto one eighth of a revolution in a counter-clockwise direction. It is, therefore, obvious that in the four cycles of operation required for a complete overdraft conversion operation the cluster of cams, including the cams 35 and 36, will receive one revolution of movement in a counter-clockwise direction, which is necessary for the proper controlling of the overdraft mechanism.

A spring-pulled retaining pawl 122 (Fig. 8) free on a shaft 123 supported in the machine framework, in cooperation with the teeth of the ratchet 106, prevents rotrograde movement of the cam cluster assembly during rotation thereof. A disk 108 is interposed between the ratchets 106 and 107 to insure that the pawls 111 and 112 coact only with the teeth of their corresponding ratchets.

During its rotation the periphery of the cams 35 (Fig. 9) coacts with a roller 125 carried by a lever 126, free on the shaft 123. The lever 126 is pivotally connected by a link 127 to a bell crank 128 secured on the shaft 8, said bell crank and said shaft being urged in a clockwise direction by a spring 129 to normally maintain the roller 125 in yielding contact with the periphery of the cam 35, so that said cam will control the operation of the shaft 8, after either the Credit Balance or Sub-Credit Balance keys 26 or 27 has been depressed. The forward end of the lever 126 (Fig. 9) has a bent-over ear 130 which is engaged by a latch 131 to maintain the parts in the positions here shown when the machine is at rest, in which position the roller 125 is not in contact with the periphery of the control cam 35. Depressing either the Credit Balance key 26 or the Sub-Credit Balance key 27 disengages the latch 131 from the ear 130 to free the lever 126 and the shaft 8 to the action of the spring 129, which immediately rocks said shaft clockwise, as viewed in Fig. 9 and counter-clockwise as viewed in Fig. 2, until the roller 125 contacts the periphery of the cam 35.

When the shaft 8 is rocked, as referred to above, the plate 14 contacts the stud 12 on the total key latch 13, to rock said latch and cause the pawls 32 and 33 to obstruct the flying lever 34 to condition the No. 3 totalizer for a total-taking operation. During this cycle of machine operation, an overdraft retaining device (not shown, but fully disclosed in the description of Figs. 10, 22, and 23 of the Lehman Patent No. 2,243,806) is selected by a cam 36 (Fig. 3) in known manner, to receive the complementary overdraft.

Figures 3, 5, 6:
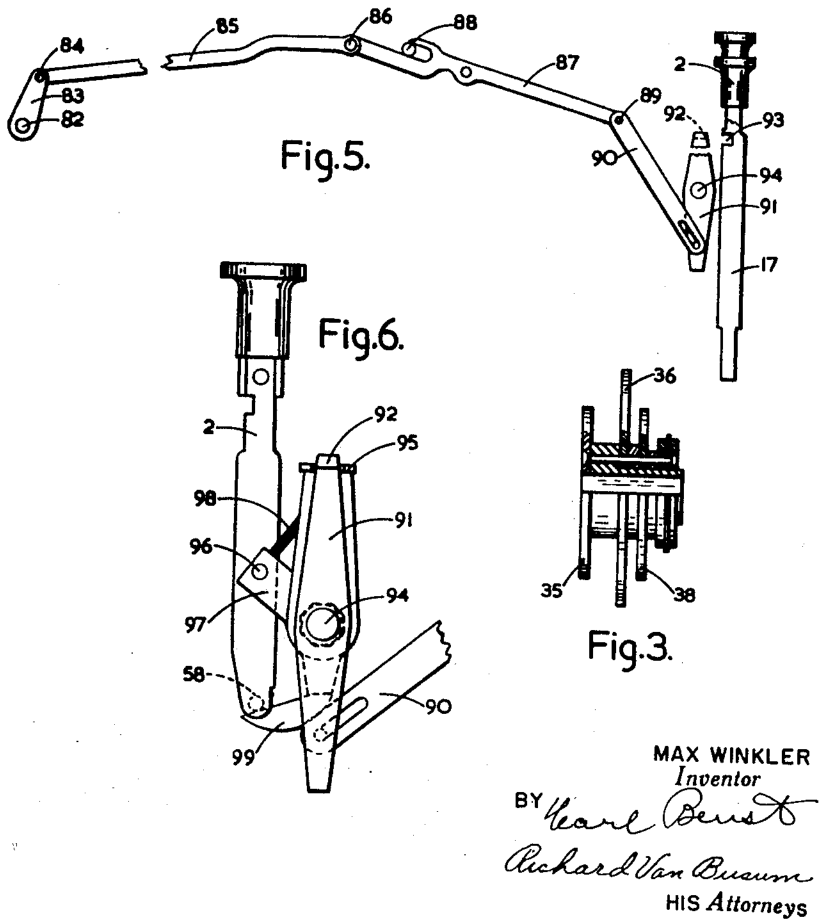
Fig. 3 is a sectional view of the overdraft cam assembly which controls the machine during overdraft conversion operations.
Fig. 5 shows mechanism normally effective to lock one of the total-taking keys when the associated totalizer is overdrawn.
Fig. 6 shows an interlocking mechanism associated with the mechanism of Fig. 5 locking out the total-taking key for one totalizer when an overdraft control key for another totalizer is operated, and vice versa.

Rotation of the overdraft cam assembly shown in Fig. 3, during an overdraft conversion operation, as described above, causes the cam 25 to impart a further counter-clockwise movement to the shaft 8 (Fig. 2), whereupon a finger 9 on the arm 7 contacts a stud 10 in the usual subtract control lever 11 for the No. 3 totalizer. The subtract control lever 11 then functions, to set the pawls 32 and 33 so that the No. 3 totalizer is conditioned for a subtract operation during the second cycle of the machine. Concurrently the cam 36 (Fig. 3) causes the auxiliary retaining device, which contains the complementary overdraft figure, to be selected for a total-taking operation. During this cycle, therefore, the complementary figure taken from the auxiliary retaining device will be subtracted from the No. 3 totalizer, leaving the true overdraft figure in said totalizer.

During the third cycle, due to the fact that the upper end of the plate 14 remains in contact with the stud 12 on the total key latch 13, under the influence of the surface of the cam 35 (Fig. 3), the No. 3 totalizer is conditioned for a total-taking operation to take the true figure therefrom. After this total has been taken from the No. 3 totalizer, the cam 36 again selects the auxiliary retaining device for an adding operation in known manner. Thus, during the third cycle, the true overdraft is cleared from the No. 3 totalizer and transmitted additively to the auxiliary retaining device.

The machine now performs its fourth, and last, cycle of operation. Just prior to this, at the end of the third cycle, a high portion 132 (Fig. 9) of the cam 35 causes the shaft 8 to be restored to home position, wherein the latch 131 again engages the ear 130 of the lever 126. This permits the arm 7 to be restored by the spring 105 (Fig. 10) to its normal position wherein the plate 114 (Fig. 10) for the No. 1 totalizer corresponding and oppositely disposed to the plate 14, is in alignment with a total key latch for the No. 1 totalizer.

During the fourth cycle, the cam 36 causes the auxiliary retaining device to be selected for a total-taking operation.

The printing mechanism which has been disabled during the first three cycles, as disclosed in United States Patent No. 2,243,806, is again enabled, to cause the amount of the true overdraft to be printed, and the ribbon mechanism, which is conditioned to print in red, as referred to more fully later in this description, causes the overdraft to be printed in red to distinguish it from a positive figure.

At the end of the four-cycle total-taking operation, it will be seen that totalizer No. 3 is left at zero, as is also the auxiliary retaining device, and the machine is ready for further computations in respect of the No. 3 totalizer.

In regard to Sub-Credit balance operations, which are intiated by depression of the Sub-Credit balance key 27, the latch 131 (Fig. 9) is rendered ineffective to engage the ear 130 of the lever 126, when said lever is restored by the projection 132 near the end of the third cycle of operation, as explained above. Consequently, the spring 129 again rocks the shaft 8 clockwise, as viewed in Fig. 9 and counter-clockwise, as viewed in Fig. 2, until the roller 125 contacts a surface 133 of said cam, which causes the arm 9 to again select and condition the #3 totalizer for a subtract operation during which the true amount of overdraft is subtracted therefrom to leave the complementary figure of the overdrafts standing on the wheels thereof, so that further computations may be carried on in the #3 totalizer, if desired. Near the end of the fourth cycle of a Sub-Credit Balance operation, a projection 134 on the periphery of the cam 35 (Fig. 9) which is identical to the projection 132, restores the lever 126 and associated parts to normal or home position as here shown, and the latch 131 engages the ear 130 to retain said parts in home position against the action of the spring 129.

Certain interlocking devices are provided to ensure proper operation of the parts during an overdraft conversion operation with respect to the No. 3 totalizer, and these will now be described.

*Locking and releasing of the O. D. 3 key*

In order that the O. D. 3 key 2 (Fig. 5) may be retained in depressed position for an appropriate time during an overdraft conversion operation in respect of the No. 3 totalizer, any suitable locking and releasing mechanism may be provided for this key, operated under the control of the ribbon color shift mechanism, which is adapted, in known manner, to be shifted from black to red printing position in the second cycle of an overdraft conversion operation, in which position it is maintained until the true overdraft figure has been printed in the first half of the fourth cycle. During the second half of this fourth cycle of machine operation, the ribbon color shift mechanism is restored to normal black printing position.

*Release of normally locked overdraft and sub-overdraft keys when the O. D. 3 key is operated*

In the present machine, the existing mechanism whereby the occurrence of an overdraft in the No. 1 totalizer unlocks the Overdraft and Sub-Overdraft keys 26 and 27 (Fig. 1) is utilised, and only brief reference will be made to mechanism disclosed in the prior U. S. patents.

When the No. 1 totalizer becomes overdrawn, an overdraft shaft 65 (Fig. 4) is rocked counter-clockwise. Through a link 66 and a pitman 67, this movement of the shaft 65 is transmitted to a latch 68, rocking the latter counter-clockwise to position a lug 69 on the foot thereof in a notch 70 in the stem of a total-taking key 71 for the No. 1 totalizer, thus locking said key against depression.

The counter-clockwise movement of the shaft 65 also releases a locking latch for the Overdraft and Sub-Overdraft keys 26 and 27 (Fig. 1), freeing them for depression to initiate an overdraft conversion operation.

Figure 2:
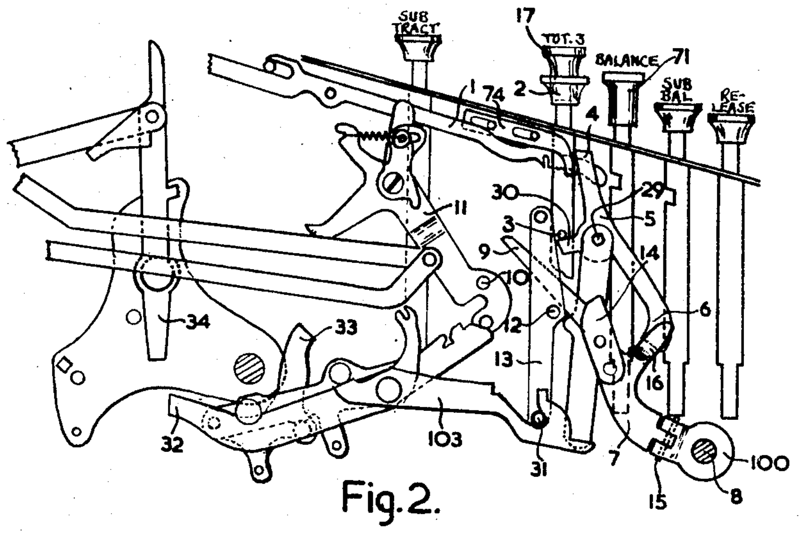
Fig. 2 is a view of part of the mechanism at the left-hand side of the machine.
Figure 4:
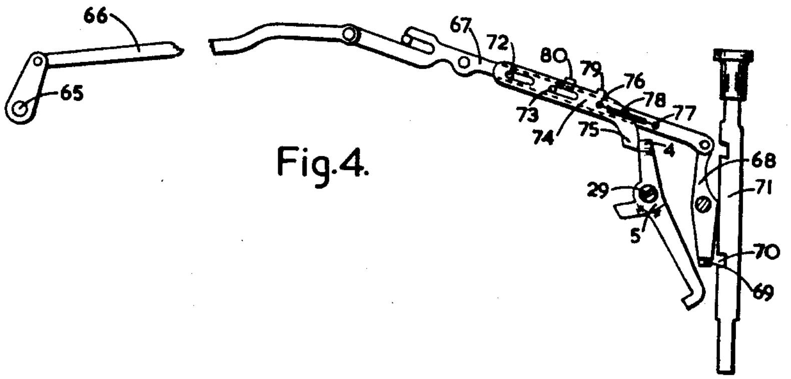
Fig. 4 shows mechanism normally associated with one totalizer for releasing the locked overdraft total and sub-total keys, and part of the mechanism enabling it to be controlled when another totalizer is overdrawn.

Mounted on studs 72 and 73 (Fig. 4) secured to the machine framework is a slide 74 having a downward extension 75 adapted to cooperate with the lever 5 (Figs. 2 and 4). Anchored between a stud 76 on the slide 74 and a stud 77 secured to the keyboard frame is a spring 78 adapted normally to maintain the slide 74 in the position shown in Fig. 4.

A lug 79 on the top of the slide 74 is adapted to cooperate with a projection 80 on the pitman 67.

When the O. D. 3 key 2 (Figs. 1, 2, 5 and 6) is depressed, after the occurrence of an overdraft in the No. 3 totalizer, the lever 5, as previously stated, is rocked counter-clockwise. During this rocking movement, the extension 4 contacts the extension 75 on the slide 74, moving the latter to the left as seen in Fig. 4, whereupon the lug 79 contacts the projection 80 on the pitman 67, moving the latter to the left and rocking the overdraft shaft 65 counter-clockwise.

In known manner, counter-clockwise movement of the overdraft shaft 65 causes the Overdraft and Sub-Overdraft keys 26, 27 (Fig. 1) to be released for depression.

Depression of either of the keys 26 or 27 causes the machine to perform an overdraft conversion operation in respect of the No. 3 totalizer, as previously explained.

When the O. D. 3 key 2 (Figs. 1, 2, 5 and 6) is released for restoration to underpressed position, as referred to above, the lever 5 (Fig. 4) is restored clockwise, removing the extension 4 thereon from the extension 75 on the slide 74, permitting the spring 78 to restore the slide 74 to the right, whereupon the parts are again positioned as shown in Fig. 4.

Should an overdraft be present in the No. 1 totalizer concurrently with the occurrence of an overdraft in the No. 3 totalizer, then the overdraft shaft 65 (Fig. 4) would already be in its counter-clockwise position at the time that the O. D. 3 key 2 (Fig. 2) is depressed. In this event, the leftward movement of the slide 74 (Fig. 4), consequent upon depression of the O. D. 3 key 2, would merely be an idle one in which the lug 79 would move to the left until it reached the already shifted projection 80.

On the other hand, if the No. 1 totalizer contains a positive balance at the time an overdraft occurs in the No. 3 totalizer, the shaft 65 will be rocked counter-clockwise upon depression of the O. D. 3 key 2 as explained above. Obviously this rocking of the overdraft shaft 65 will cause the latch 68 to lock the No. 1 total-taking key 71 against depression, but this is of no consequence, as the operator is not concerned, at this time, with the No. 1 totalizer. When the overdraft conversion operation is completed, the overdraft shaft 65 will be restored clockwise in the known manner, as disclosed in U. S. Patents Nos. 2,079,355 and 2,243,806, causing the No. 1 total-taking key 71 again to be unlocked.

From the foregoing it will be clear that, although an overdraft conversion operation in the No. 3 totalizer utilizes the conversion mechanism normally associated with the No. 1 totalizer, it in no way affects the condition, positive or negative, in which the latter stands at this time, nor does it affect, when the overdraft conversion operation is completed, the normal functioning of the overdraft control mechanism associated with the No. 1 totalizer.

*Interlocking mechanism between the total-taking key for the No. 3 totalizer and the O D. 3 key*

An interlocking mechanism is provided between the O. D. 3 key 2 (Figs. 1, 2, 5 and 6) and the total-taking key 17 for the No. 3 totalizer so that, when one key is locked, the other is free, and vice versa, and this mechanism will now be described.

In known manner, when there is an overdraft in the No. 3 totalizer, the total-taking key 17

(Figs. 1, 2 and 5) therefore is locked against depression and, when this occurs, a shaft 82 (Fig. 5) is rocked counter-clockwise.

Fast on the shaft 82 is an arm 83 carrying a stud 84 to which a link 85 is pivoted. Pivoted to a stud 86 on the link 85 is a pitman 87 slidable on a stud 88. Pivotally connected to a stud 89 on the pitman 87 is a link 90 coupled, by a pin and slot connection, to a latch 91 having a lug 92 on the upper end thereof engageable with a notch 93 in the stem of the No. 3 total key 17.

When the overdraft shaft 82 is rocked counter-clockwise, the latch 91 is rocked clockwise, whereupon the lug 92 enters the notch 93 to lock the total-taking key 17 for the No. 3 totalizer against depression.

Associated with the latch 91 is an interlocking device for the O. D. 3 key 2, and this will now be described.

Pivotally mounted on a stud 94 (Figs. 5 and 6) mounted in an order plate (not shown), and adapted to support the latch 91, is a locking lever 95 (Fig. 6). Anchored to a stud 96 on an extension 97 of the locking lever 95 is a spring 98, the other end of which is secured to a stud in the order plate. The spring 98 normally maintains the locking lever 95 in the position shown in Fig. 6 wherein a tail 99 of said lever lies beneath the stud 58 (Fig. 6) in the O. D. 3 key 2.

The locking lever 95 (Fig. 6) has a bifurcated upper end embracing the upper end of the latch 91.

When the overdraft shaft 82 rocks counter-clockwise (Fig. 5), as referred to above, the latch 91 is rocked clockwise as seen in this figure and counter-clockwise as seen in Fig. 6. This counter-clockwise rocking of the latch 91 rocks the locking lever 95 also counter-clockwise so as to remove the tail 99 from the path of the stud 58 on the O. D. 3 key 2, so that the latter is freed for depression at this time.

When the overdraft shaft 82 (Fig. 5) is rocked clockwise in the usual manner at the conclusion of an overdraft total-taking operation, as referred to in United States Patent No. 2,088,092, the latch 91 and the locking lever 95 will be restored clockwise, as seen in Fig. 6, the spring 98 assisting in this restoration. This causes the lug 92 on the latch 91 (Figs. 5 and 6) to be removed from the notch 93 in the stem of the total key 17, and re-positions the tail 99 (Fig. 6) of the locking lever 95 beneath the stud 58 in the stem of the O. D. 3 key 2. Thus the total-taking key 17 is now free to be depressed and the O. D. 3 key 2 is locked against depression by the tail 99.

From the foregoing it will be seen that, when the total-taking key 17 is free for depression the O. D. 3 key 2 is locked against depression, and vice versa.

It will be appreciated that, in a sub-total-taking operation, since the amount of the overdraft is re-transmitted to the No. 3 totalizer at the end of said operation, in the usual manner, the overdraft shaft 82 is left in a counter-clockwise position and therefore the total-taking key 17 is locked and the O. D. 3 key 2 is free for depression at this time.

What is claimed is:

1. In a machine of the character described having two add-subtract totalizers and separate means for each totalizer to control the functions therein, and having a device common to both totalizers to convert the complementary figure of an overdraft in either of said totalizers to a true negative figure, the combination of a cam constructed and arranged to be driven by the device; means including a shaft controlled by the cam; a part secured to the shaft; a member hinged to the part and controlled by the shaft; yieldable means normally effective to retain the member in coacting relationship with the separate means for a certain one of said totalizers whereby operation of the cam causes the complementary figure of an overdraft therein to be converted to a true negative figure; a cam part on the member; a depressible overdraft control key; a stud in the key; an element comprising an extension coacting with the stud and an extension coacting with the cam part, said element effective upon depression of the overdraft key to move the member out of coacting relationship with said one separate means and into coacting relationship with the separate means for the other totalizer, whereby operation of the cam causes the complementary figure of an overdraft therein to be converted to a true negative figure; means normally effective to lock the overdraft key against depression; and means operable upon the occurrence of an overdraft in said other totalizer to unlock the locking means.

2. In a machine of the class described having two add-subtract totalizers, means including two positionable levers for each totalizer to select and condition their corresponding totalizer for various functions, and having a device common to both of the totalizers to convert the complementary figure of an overdraft in either of said totalizers to a true negative figure, the combination of means including a shaft operated by the device; a part secured on the shaft; a member hinged to the part and operated by said part and the shaft; yieldable means normally effective to retain the member in coacting relationship with the two levers for one totalizer, whereby operation of the shaft causes said member to coact with said levers to convert the complementary figure of an overdraft in said one totalizer to a true negative figure; a cam part on the member; a depressible overdraft control key; a stud in the key; and an element comprising an extension coacting with the stud and an extension coacting with the cam part, said element effective upon depression of the overdraft key to move the hinged member out of coacting relationship with said two levers for said one totalizer and into coacting relationship with the two levers for the other totalizer, whereby operation of the shaft causes said hinged member to coact with said latter levers to convert the complementary figure of an overdraft in said other totalizer to a true negative figure.

3. In a machine of the class described, having two add-subtract totalizers, separate means for each totalizer to control the functions therein, and a single device for selectively converting the complementary amount of an overdraft in either totalizer to a true negative amount, the combination of a cam operated by the device; a shaft controlled by the cam; a flexible member connected to the draft and controlled in its operation thereby, said member constructed and arranged to selectively coact with either of the separate means; yieldable means normally effective to maintain the flexible member in coacting relationship with the separate means for one totalizer to cause the complementary amount of an overdraft in said totalizer to be converted to a true negative amount; a depressible overdraft control key; and means effective upon the depression of the overdraft control key to move the flexible member out of coacting relationship with the separate means for said one totalizer and into coacting relationship with the separate means for the other totalizer, to cause the complementary amount of an overdraft in said other totalizer to be converted to a true negative amount.

4. In a machine of the class described, having two add-subtract totalizers, means including two positionable levers for each totalizer to select and condition their corresponding totalizer for various functions, and having a single device common to both of the totalizers for converting the complementary figure of an overdraft in either of said totalizers to a true negative figure, the combination of a cam constructed and arranged to be driven by the device; means including a shaft controlled by the cam; means comprising a member constructed and arranged to coact with the levers for the two totalizers, said member hingedly connected to the shaft and controlled thereby; yieldable means normally effective to retain the member in coacting relationship with the two levers for one totalizer, whereby operation of the shaft causes said member to coact with said levers to convert the complementary figure of an overdraft in said one totalizer to a true negative figure; a depressible overdraft control key; and an element intermediate the overdraft control key and the member, and forming an operating connection therebetween, said element effective upon depression of the overdraft control key to move the member out of coacting relationship with said two levers for said one totalizer and into coacting relationship with the two levers for the other totalizer, whereby operation of the shaft causes said member to coact with said latter levers to convert the complementary figure of an overdraft in said other totalizer to a true negative figure.

5. In a machine of the character described, having two add-subtract totalizers and separate means for each totalizer to control the functions therein, and having a single device for selectively converting the complementary figure of an overdraft in either of said totalizers to a true negative figure, the combination of a cam constructed and arranged to be driven by the device; means including a shaft controlled by the cam; a member connected to the shaft and operated thereby, said member movable relatively to said shaft into coacting relationship with either of the separate means to select and condition either of the totalizers for an overdraft conversion operation; yieldable means normally effective to retain the member in coacting relationship with separate means for one of the totalizers, whereby operation of the cam causes the complementary figure of an overdraft therein to be converted to a true negative figure; a cam part on the member; a depressible overdraft control key; and an element forming an operating connection between the key and the cam part, said element effective upon depression of the key to move the member out of coacting relationship with the separate means for said one totalizer and into coacting relationship with the separate means for the other totalizer whereby operation of the cam causes the complementary figure of an overdraft therein to be converted to a true negative figure.

MAX WINKLER.

References Cited in the file of this patent

UNITED STATES PATENTS

| Number | Name | Date |
|---|---|---|
| 1,987,015 | Lehman | Jan. 8, 1935 |
| 2,083,092 | Ott | July 27, 1935 |
| 2,131,361 | Anderson | Sept. 27, 1938 |
| 2,167,760 | Lee | Aug. 1, 1939 |
| 2,243,806 | Lehman | May 27, 1941 |
| 2,250,837 | Muller | July 29, 1941 |

FOREIGN PATENTS

| Number | Country | Date |
|---|---|---|
| 373,666 | Germany | Apr. 14, 1923 |